2,830,971
Patented Apr. 15, 1958

2,830,971

ARTIFICIAL RESIN FROM FURFURYL ALCOHOL, FORMALDEHYDE, AND BORIC ACID, AND PROCESS OF MAKING THE SAME

Lloyd H. Brown, Oak Park, and Edward A. Reineck, Highland Park, Ill., assignors to Quaker Oats Company, Chicago, Ill., a corporation of New Jersey No Drawing. Application July 29, 1953
Serial No. 371,152

8 Claims. (Cl. 260—67)

The present invention relates to an artificial resin made from furfuryl alcohol, formaldehyde and boric acid, and also to the process by which it is produced.

It has long been known that furfuryl alcohol and formaldehyde can be condensed under the influence of suitable catalysts, with the production of resinous substances which were either liquids or solids, and which, by appropriate further reaction, such as by heating, could be converted into ultimately insoluble and infusible resinous materials.

It is one of the objects of the present invention to produce a still liquid but viscous condensation product of furfuryl alcohol, formaldehyde and boric acid, which may subsequently be transformed into an infusible and insoluble solid.

It is a further object to effect the condensation of furfuryl alcohol and formaldehyde by means of a catalyst which may be allowed to remain in the product formed, so as to be available for the further conversion of the product by merely heating it.

It is a further object of the present invention to provide a method for the condensation of furfuryl alcohol and formaldehyde in which the hydrogen-ion concentration is quite low, in any event lower than about pH 4.0, even though an actual acid is employed as the catalyst for effecting the reaction.

Other objects of the present invention will become apparent from the further description hereinbelow.

In carrying out the present invention, furfuryl alcohol and formaldehyde are mixed in about the ratio of one mol of the furfuryl alcohol to about 0.6 mol of the formaldehyde, whereafter the resulting mixture is adjusted to a hydrogen-ion concentration of not greater than about pH 5, and then has added to it about 10%, as calculated on the weight of the furfuryl alcohol, of boric acid, $H_3BO_3$; whereafter the mixture is maintained at a temperature of about 100° C. for a considerable length of time, say on the order of about eight hours. During the condensation reaction a reflux condenser was used to return any volatilized material to the vessel in which the operation was conducted. After the desired resinous product had been obtained, which was determined by measuring its viscosity, water and uncombined formaldehyde were distilled off, and the formaldehyde recovered for further use. Under the stated conditions, the furfuryl alcohol was found all to have been converted into a dark colored liquid product containing no unconverted furfuryl alcohol. Its viscosity was about 1200 centipoises; and it could be converted by heating into a hard, insoluble and infusible resin in about eight minutes.

By reason of this ability to become hardened, the liquid resin of the present invention may be formulated into molding powders by admixture with suitable amounts of fillers, such as wood flour, asbestos, rotten-stone and the like. Such powders may then be cured in the usual type of pressure molds, as is well known in the plastics art. The boric acid remains in the product and forms a part of it; but it is insufficiently acid to have any deleterious effects on metallic molds, or on cellulosic fillers.

The hydrogen-ion concentration of the finished liquid resin was determined by shaking it with an equal amount of water and measuring the pH of the liquid, which was found to be about pH 4.0. The increase in acidity was probably caused by the formation of a small amount of levulinic acid.

The apparatus required for the carrying out of the present invention is of the simplest nature, comprising merely a suitable vessel provided with refluxing, stirring, and condensation means; and hence does not need illustration.

Inasmuch as the viscosity of the resin produced is variable, as by shortening or lengthening the time period of the heating step, the manufacturer can thus provide any desired viscosity demanded by the potential user of the resin. In general it may be stated that the range of viscosities may lie between about 200 to 1500 centipoises; although a resin having a viscosity of 1200 centipoises appears to be the most desirable; and it is this type of resin which will be produced by operating under the conditions above set forth.

Self-evidently, also, the amount of boric acid may be varied within reasonable limits, say from about 5% up to 15%. Any boric acid which does not dissolve in the mixture can be filtered off at the end of the operation from the liquid resin, and hence recovered for further use. When using 10% boric acid, it is possible in this way to recover about 3%, leaving the other 7% as part of the finished liquid resin. Likewise the relative proportions of the furfuryl alcohol and the formaldehyde may be varied, within a range of from about one-tenth mol of formaldehyde up to about 2 mols.

Under the conditions of the example above given, some of the formaldehyde was recovered in the distillate. Analyses of such distillate showed that about 63% of the formaldehyde which had been added to the furfuryl alcohol was recovered, showing that about 37% of the amount added had combined with the furfuryl alcohol in the formation of the liquid resin.

Applicants claim:

1. Method of producing an artificial resin which comprises heating a mixture of furfuryl alcohol and formaldehyde in the ratio of from about $\frac{1}{10}$ to 2 mols of formaldehyde per mol of furfuryl alcohol, in the presence of about 5 to 15% of boric acid as calculated on the weight of the furfuryl alcohol, the reaction being carried out at a hydrogen-ion concentration less than that equivalent to a pH of 4.0.

2. Method of producing an artificial resin which comprises heating a mixture of about one mol of furfuryl alcohol and about 0.6 mol of formaldehyde in the presence of about 10% of boric acid as calculated on the weight of the furfuryl alcohol, the reaction being carried out at a hydrogen-ion concentration less than that equivalent to a pH of 4.0.

3. Method of producing an artificial resin which comprises heating a mixture of about one mol of furfuryl alcohol and about 0.6 mol of formaldehyde in the presence of about 10% of boric acid as calculated on the weight of the furfuryl alcohol, the reaction being carried out at a hydrogen-ion concentration less than that equivalent to a pH of 4.0, and until a resin having a viscosity of about 1200 centipoises is obtained and substantially all of the furfuryl alcohol has become converted to the resin.

4. Method of producing an artificial resin which comprises mixing furfuryl alcohol and formaldehyde in the proportion of about one mol of the former to about 0.6 mol of the latter, adjusting the hydrogen-ion concentration of the mixture to about pH 5, adding about 10% of boric acid as calculated on the weight of the furfuryl alcohol, and heating the mixture at about 100° C. until a resin having a viscosity of about 1200 centipoises has been formed.

5. An artificial resin capable of being converted to the insoluble and infusible stages and consisting of a condensation product of furfuryl alcohol, formaldehyde and boric acid formed by heating said furfuryl alcohol, formaldehyde and boric acid at a hydrogen ion concentration less than that equivalent to a pH of 4 in a formaldehyde-furfuryl alcohol molar ratio of from about 1/10 to 2 mols of formaldeyhde per mol of furfuryl alcohol, said boric acid being present in the amount of about 5% to 15% as calculated on the weight of the furfuryl alcohol.

6. An artificial resin capable of being converted to the insoluble and infusible stages and consisting of a condensation product of furfuryl alcohol, formaldehyde and boric acid formed by heating said furfuryl alcohol, formaldehyde and boric acid at a hydrogen ion concentration less than that equivalent to a pH of 4, said furfuryl alcohol and formaldehyde being initially present in a molar ratio of from about ½ to 2 mols of formaldehyde per mol of furfuryl alcohol, said boric acid being present in the amount of from about 5 to 15% as calculated on the weight of the furfuryl alcohol, said resin having a viscosity of about 1200 centipoises.

7. An artificial resin capable of being converted to the insoluble and infusible stages and consisting of a condensation product formed by heating at a hydrogen ion concentration of less than that equivalent to a pH of 4 about one mol of furfuryl alcohol, about 0.6 mol formaldehyde, about 10% by weight, as calculated on the weight of the furfuryl alcohol, of boric acid, and having a viscosity of about 1200 centipoises.

8. Process of producing a heat-curable resin from furfuryl alcohol and formaldehyde which comprises reacting about 1 mol of furfuryl alcohol with about 0.6 mol of formaldehyde, using about 5 to 15% of boric acid as a catalyst as calculated on the weight of the furfuryl alcohol and operating at a hydrogen ion concentration less than about pH 4.0 to produce a resin which is convertible into an infusible product by further heating.

References Cited in the file of this patent

UNITED STATES PATENTS

| | | |
|---|---|---|
| 2,343,972 | Harvey | Mar. 14, 1944 |
| 2,601,497 | Brown | June 24, 1952 |

FOREIGN PATENTS

Ellis: "Chemistry of Synthetic Resins," vol. 1, pages 348–351, Reinhold Publishers, New York (1935).